(12) United States Patent
Cucchetti

(10) Patent No.: US 11,145,154 B2
(45) Date of Patent: Oct. 12, 2021

(54) ENHANCED EJECTION DEVICE FOR AN AUTOMATIC VENDING MACHINE

(71) Applicant: ASG S.R.L., Milan (IT)

(72) Inventor: Stefano Cucchetti, Parabiago (IT)

(73) Assignee: ASG S.R.L., Milan (IT)

(*) Notice: Subject to any disclaimer, the term of this patent is extended or adjusted under 35 U.S.C. 154(b) by 106 days.

(21) Appl. No.: 16/610,711

(22) PCT Filed: May 3, 2018

(86) PCT No.: PCT/IB2018/053072
§ 371 (c)(1),
(2) Date: Nov. 6, 2019

(87) PCT Pub. No.: WO2018/203270
PCT Pub. Date: Nov. 8, 2018

(65) Prior Publication Data
US 2020/0160645 A1 May 21, 2020

(30) Foreign Application Priority Data
May 4, 2017 (IT) .......................... 102017000048358

(51) Int. Cl.
G07F 11/42 (2006.01)
B65G 1/08 (2006.01)
G07F 11/00 (2006.01)
G07F 11/10 (2006.01)

(52) U.S. Cl.
CPC ............... *G07F 11/42* (2013.01); *B65G 1/08* (2013.01); *G07F 11/007* (2013.01); *G07F 11/10* (2013.01)

(58) Field of Classification Search
CPC ...................................................... G07F 11/42
See application file for complete search history.

(56) References Cited

U.S. PATENT DOCUMENTS

| | | | |
|---|---|---|---|
| 4,744,490 A * | 5/1988 | Albright | G07F 11/42 211/59.3 |
| 5,873,489 A | 2/1999 | Ide et al. | |
| 2008/0223871 A1 | 9/2008 | Leonetti | |
| 2015/0096997 A1* | 4/2015 | Obitts | A47F 1/125 221/1 |

(Continued)

FOREIGN PATENT DOCUMENTS

| | | |
|---|---|---|
| CN | 204896572 U | 12/2015 |
| EP | 1998295 A2 | 12/2008 |
| JP | H11250343 A | 9/1999 |

(Continued)

*Primary Examiner* — Gene O Crawford
*Assistant Examiner* — Ayodeji T Ojofeitimi
(74) *Attorney, Agent, or Firm* — Dickinson Wright PLLC; Andrew D. Dorisio

(57) ABSTRACT

An enhanced ejection device (10) for an automatic dispenser (12) of the automatic vending machine type, suitable for being incorporated in said automatic vending machine and applied to a shelf (14) subdivided into seats or channels (28) defined by opposing separator elements or shoulders (26) internally to which there are accommodated products of different types, the device comprising product handling and ejection means (27) for handling and ejecting the product from said seats or channels, and said handling and ejection means (27) being quickly couplable with/decouplable from the shelf (14).

11 Claims, 3 Drawing Sheets

(56) References Cited

U.S. PATENT DOCUMENTS

Figure 1:
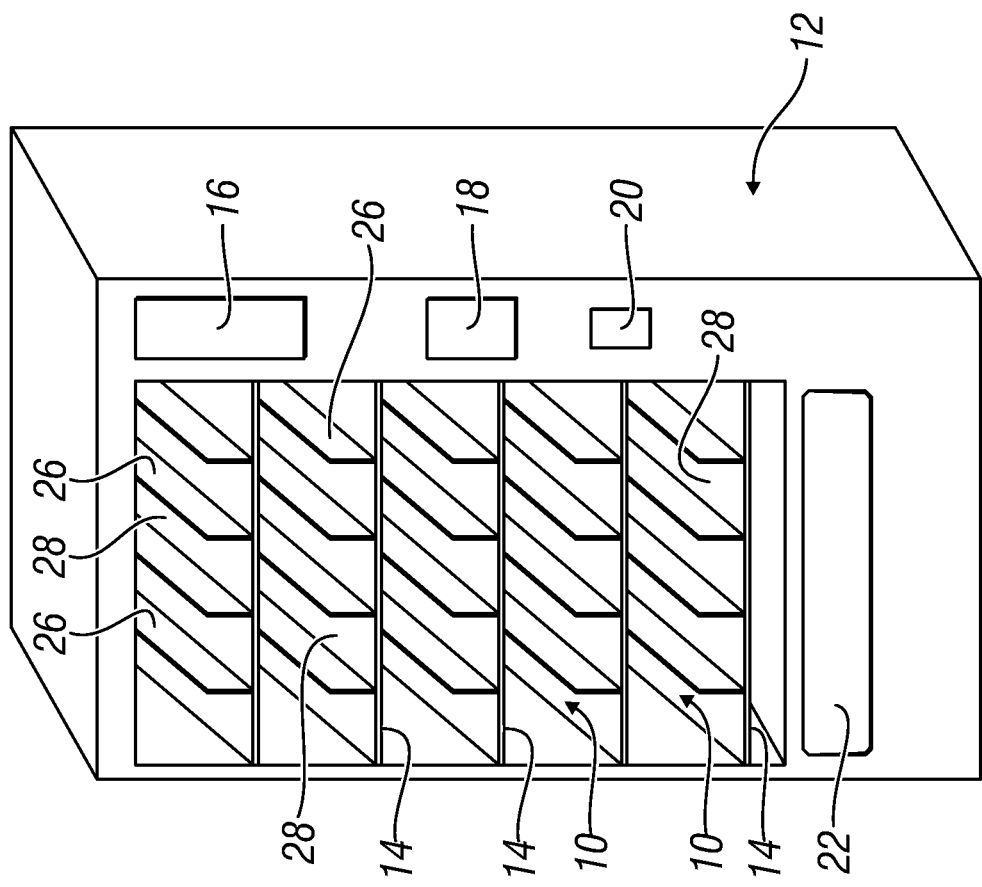

2015/0102048 A1* 4/2015 Case .................. B65H 45/142
                                                           221/1

FOREIGN PATENT DOCUMENTS

| JP | 2000123239 A | 4/2000 |
|----|--------------|--------|
| JP | 2001060285 A | 3/2001 |
| JP | 2005011308 A | 1/2005 |
| WO | 2008097094 A1 | 8/2008 |

* cited by examiner

ENHANCED EJECTION DEVICE FOR AN AUTOMATIC VENDING MACHINE

FIELD OF THE INVENTION

The present invention refers to an enhanced ejection device for an automatic vending machine.

BACKGROUND OF THE INVENTION

More specifically, the present invention refers to a product ejection device for an automatic dispenser of the type commonly referred to as vending machine.

As is known, the so-called vending machines are dispensing apparatuses used to dispense food products such as, for instance, water, drinks of different types, snacks or chips and the like, or products of different types such as, for instance, books, travel kits, or the like.

The mentioned products will be dispensed by the vending machine upon a selection made by a user who, for instance, after inserting into the vending machine a sum of money corresponding to the cost of the desired product, selects/enters the code of the product in a keypad of the vending machine's frame reserved therefore, which results in activating the ejection procedures whereby the product selected is ejected from the storage shelf to the product outlet/unload zone which can be accessed by the user to pick up the selected product.

The automatic vending machines are typically formed of a frame defining a container element, internally to which there are arranged a plurality of superimposed and parallel shelves, each provided with a plurality of transversal shoulders parallel to each other, suitable for defining, for every shelf, a number of adjacent channels or seats for storing the products loaded into the vending machine.

In the vending machines traditionally present on the market, internally to the adjacent channels or seats as mentioned above there are arranged dispensing means typically formed of a spiral, which develops according to the direction of development of the channels or seats themselves, i.e. according to a direction transversal to the direction of longitudinal development of the shelves. Said dispensing means of the spiral type perform a dual function, i.e. holding the products sequentially ordered within the channels or seats and moving the products in the direction of the ejection zone whenever a user selects a product.

The spiral dispensing means are rotationally driven with respect to their own axes by way of a dedicated motor and the rotation of the spirals, between the turns of which the products are positioned, determines the progress of the product between the turns and its ejection in the direction of the user collection pick-up zone.

However, such spiral dispensing means feature a number of major drawbacks typically bound to the correct management of the movement of the products in the direction of the ejection zone and caused, for instance, by products not being positioned between the turns of the spiral dispensing means or by products being jammed between the turns, if badly positioned upon the loading step, following the movements of the spiral dispensing means themselves.

A further drawback consists in that the dimensional characteristics of the spiral dispensing means are tailored to the type of product they have to handle; therefore, they shall be replaced whenever a change of format is required, which means waste of time and consequently increased maintenance costs.

Also, should it be necessary to change the spiral dispensing means, it will be necessary to re-position all spiral dispensing means present on the shelf, which entails rather long replacement times considering that all spiral dispensing means, and the opposing and parallel transversal shoulders which define the individual product storage channels or seats on the shelf of the vending machine shall be dismantled and re-positioned; such operation entails long replacement times, which consequently results in costs at the maintenance level, as well as costs resulting from the downtimes of the vending machine.

A further drawback of the traditional devices consists in their complex construction, which results in a greater complexity for that which concerns the installation and/or maintenance and repair operations and requires skilled operators.

DESCRIPTION OF THE INVENTION

An object of the present invention is to obviate the above described drawbacks.

More specifically, an object of the present invention is to provide an enhanced ejection device for an automatic vending machine that allows for an orderly storage and handling of the products accommodated in the channels or seats of the shelves of the vending machine and also prevents problems bound to products becoming jammed during the handling step whenever a user selects a desired product.

A further object of the present invention is to provide an ejection device that allows to perform a fast and easy change of format, should the characteristics and dimensions of the products loaded in the vending machine change.

A further object of the present invention is to put at the users' disposal an enhanced ejection device for an automatic vending machine suitable for guaranteeing a high strength and reliability over time and also such as to be implemented in an easy and cost-effective manner.

These objects and others are achieved by the invention, that presents the characteristics according to claim 1.

According to the invention, an enhanced ejection device is provided for an automatic vending machine, suitable for being incorporated in said automatic vending machine and applied to a shelf subdivided into a number of seats or channels defined by opposing separator elements or shoulders internally to which there are accommodated products of different types, comprising means for handling and ejecting the products from said seats or channels, said handling and ejection means being such as to be quickly coupled with/decoupled from the shelf.

Advantageous embodiments of the invention will be apparent from the dependent claims.

BRIEF DESCRIPTION OF THE DRAWING FIGURES

Figure 2:
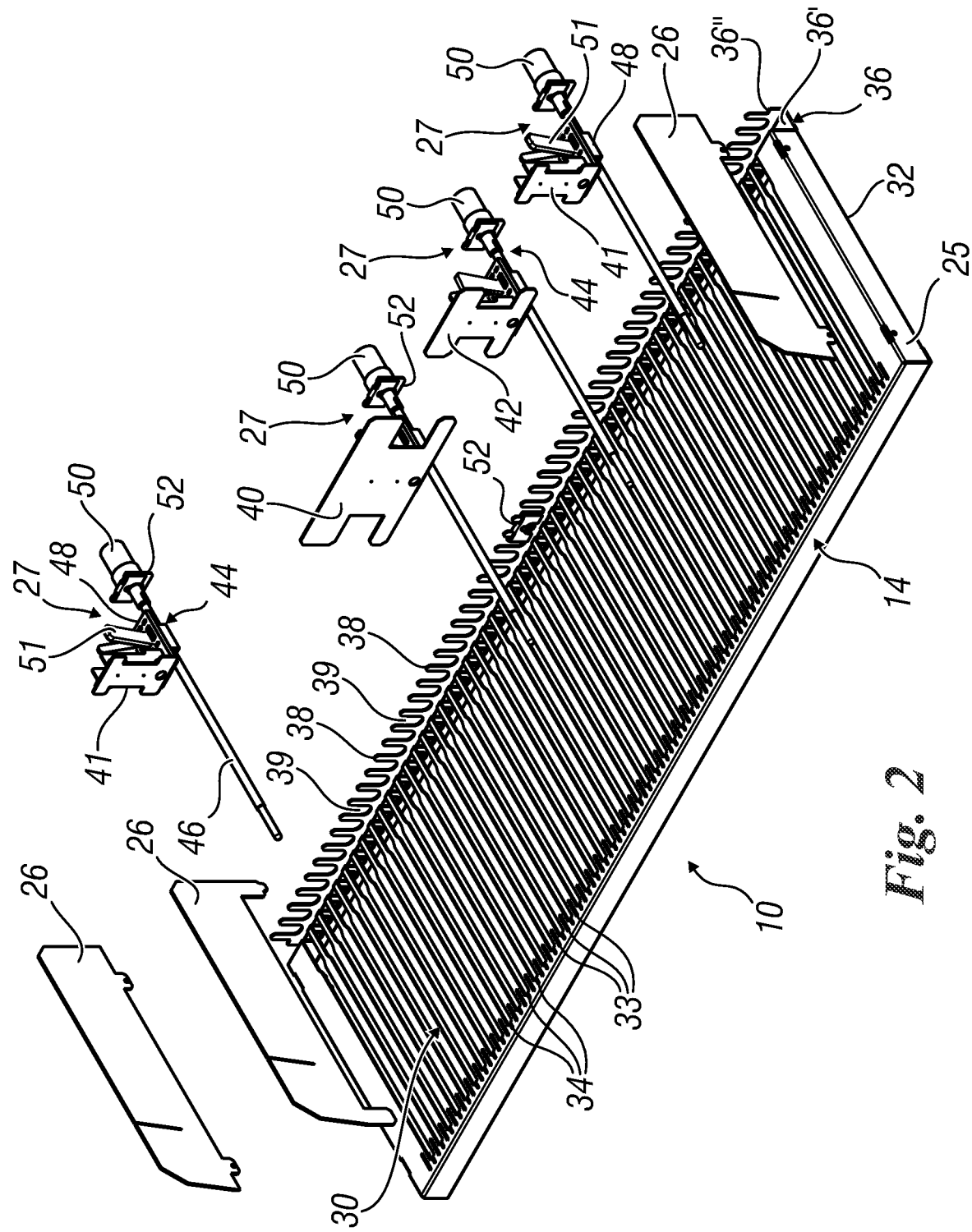
Figure 3:
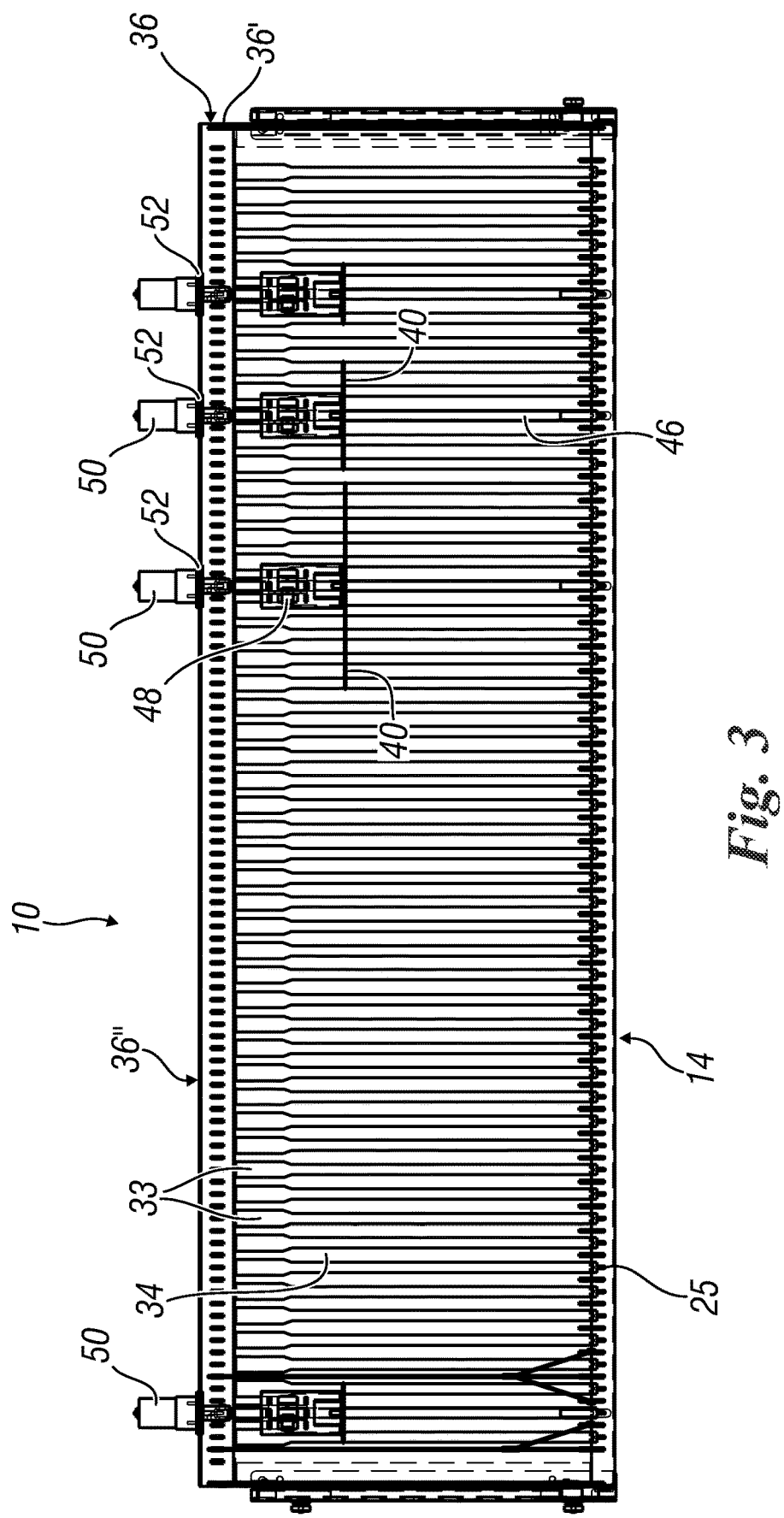

The constructional and functional characteristics of the enhanced ejection device for an automatic vending machine according to the present invention can be better understood from the following detailed description, where reference is made to the attached drawings, which illustrate a preferred, non-limitative embodiment thereof, and wherein:

FIG. 1 schematically shows an axonometric view of an automatic vending machine equipped with an enhanced ejection device according to the invention;

FIG. 2 schematically shows an exploded axonometric view of the ejection device for an automatic vending machine;

FIG. 3 schematically shows a top view of an ejection device according to the invention.

DETAILED DESCRIPTION

With reference to the mentioned figures, the enhanced ejection device for an automatic vending machine, identified by the reference numeral 10 as a whole in the figures, is suitable for being applied to a traditional automatic vending machine 12 defined, as schematically shown in FIG. 1, by a container element internally to which there are arranged a plurality of shelves 14 superimposed and tendentially parallel to each other and suitable for accommodating the products dispensed by the automatic vending machine, a first interface element 16 used by a user to select a desired product, a second interface element 18 used to pay a sum of money as necessary to buy the desired product, a third interface 20 used to return a change, coins, or the like refused by the device and, finally, a collection mouth or enclosure 22 for collecting the product ejected from one of the shelves 14 following a user's selection.

As schematically shown in more details in FIGS. 2 and 3, the shelf 14 comprises a platform 25 developing longitudinally and made from a metal sheet or a plastic material or another material suitable for this purpose, a number of separator elements or shoulders 26 secured to the platform 25 transversally to the direction of longitudinal development of the platform itself, and handling and ejection means 27 for handling and ejecting the products accommodated in the automatic vending machine.

The separator elements or shoulders 26 are arranged on the platform 25, as described above, according to a direction transversal to the direction of longitudinal development of the platform 25, parallel to each other and equally or differently spaced from each other, such as to define a number of seats or channels 28 for storing the products (such as, for instance, water bottles, cookies, and the like) the automatic vending machine is enabled to dispense. Said separator elements or shoulders 26 are removable, so that they can be positioned and re-positioned as a function of the dimensions of the seat or channel 28 necessary for accommodating the products to be dispensed.

The platform 25 comprises an upper front 30, opposite to a lower front 32, characterized in having a grating-like structure defined by a plurality of equally-spaced transversal bands 33 parallel to each other, every two transversal bands adjacent to each other being spaced away by an empty transversal portion 34, whose function will be better described below.

In correspondence with one of the opposing longitudinal edges, the platform comprises a patterned appendage 36 defined by a plate-like element 36' projecting outside from a longitudinal edge of the platform 25 and developing longitudinally (it preferably develops according to the same plane as the lower front 32 of the platform 25) and a further plate-like element 36", which develops starting from a longitudinal edge of the plate-like element 36' according to a direction substantially perpendicular to the plane of the plate-like element 36' and in the direction of the upper front 30 of the platform 25, said further plate-like element 36" being patterned like a "comb" and comprising a plurality of teeth 38 spaced away from each other by slots 39, said teeth 38 and slots 39 developing over the length of the longitudinal development of the further plate-like element 36".

Product handling and ejection means 27 are associated with the shelf 14 and their number equals that of the seats or channels 28 and comprise each a plate-like pusher element 40/41/42, whose dimensions depend on the width of the seat or channel in which they are inserted and associated with a driving/moving means 44 used to move said pusher element into the seat or channel 28; the function of the pusher element is to push the products contained in the seat or channel 28 in the direction of the unload zone whenever a user makes a selection.

The driving/moving means 44 comprise a drive of the recirculating screw type defined by a threaded shaft 46 along which a guide 48 is sliding, to which a pusher element 40/41/42 is secured to, a motor 50 secured to one end of the threaded shaft 46, and an engagement/disengagement element 51 used to engage/disengage the clutch of the threaded shaft 46.

The pusher element 40/41/42 is secured to the guide 48 either rigidly or removably and, in the latter case, it allows for a quick, easy, and cost-effective change of format of said pusher element as a function of the characteristics of the products loaded in the seats or channels of the vending machine.

The device also comprises a locking element 52 for stabilizing said driving/moving means to the shelf 14.

The locking element 52 is secured to the motor 50 in correspondence with the constraint position with respect to the threaded shaft 46 and is substantially U-shaped to make it possible to put it in the further plate-like element 36" of the patterned appendage 36.

The handling and ejection means 27, described above with reference to their constructional characteristics, are described below with reference to their coupling mode with respect to the shelf 14.

Upon assembling, the locking element 52 is put in the further plate-like element 36" and, specifically, it is put in two adjacent teeth 38 of the further plate-like element 36", the threaded shaft 46 positioning in and entering the slot 39 interposed between said two teeth 38 and the empty transversal portion 34 in the upper front 30 of the platform 25 and, likewise, the guide 48 entering said empty transversal portion 34.

In such coupling configuration, the pusher element 40/41/42 is arranged perpendicularly to the upper front 30 of the platform 25 and is slidable with respect thereto and internally to the seat or channel 28.

The advantages achievable by using the enhanced ejection device for an automatic vending machine according to the present invention are apparent from the foregoing.

The enhanced ejection device for an automatic vending machine according to the present invention has the big advantage of being easily and quickly positionable and re-positionable with respect to the shelf 14; as a matter of fact, thanks to the presence of the "comb"-shaped portion of the patterned appendage 36 and of the locking element 52, an operator, by a simple movement, can release the handling and ejection means 27 with respect to the platform 25 and, in the case of a change in the dimensions of the seat or channel or of the characteristics of the product to be loaded in the seat or channel, he can re-position them. This advantage results in a further advantage related to the time saved by the operator in charge of maintaining or refilling the automatic vending machine, which entails cost savings.

Further advantageous is the fact that the pusher element of the device according to the invention prevents products sticking or jamming problems, with the consequent advantages in terms of cost, by virtue of the fact that maintenance/repair interventions and rejects of products damaged because of jamming are reduced.

A further advantage consists in that the ejection device according to the present invention is very simple constructionally-wise, which enables even unskilled people to perform installation, maintenance, change of format, and/or repair operations.

Even though the invention has been described here above with a special reference to one embodiment given for explanatory, non-limitative purposes only, numerous modifications and variants will be apparent to those skilled in the art in the light of the above description. Therefore, the present invention is to be construed to embrace any modifications and variants that fall in the scope of the following claims.

The invention claimed is:

1. An enhanced ejection device (10) for an automatic dispenser (12) of the automatic vending machine type, suitable for being incorporated in said automatic vending machine and being applied to a shelf (14) subdivided into a number of seats or channels (28) defined by opposing separator elements or shoulders (26) internally to which there are accommodated products of different types, characterized in that it comprises handling and ejection means (27) for handling and ejecting products from said seats or channels, quickly couplable with/decoupable from the shelf (14), formed on said shelf (14) by means of quick coupling means and comprising a platform (25) longitudinally developed and a patterned appendage (36), the handling and ejection means (27) comprising a pusher element (40, 41, 42) for pushing the products in their respective seats or channels (28), driving/moving means (44) for moving said pusher element into the seat or channel (28), and quick locking means with respect to the quick coupling means of the shelf (14), the patterned appendage (36) formed in correspondence with one of the opposing longitudinal edges of the platform (25) and "comb"-shaped, with a plurality of teeth (38) spaced away from each other by slots (39), said teeth (38) and slots (39) developing all over the length of the longitudinal development of said patterned appendage (36).

2. The device according to claim 1, characterized in that the pusher element (40, 41, 42) is a plate-like one and is perpendicular to the upper front (30) of the platform (25) and has dimensions that vary as a function of the width of the seat or channel (28).

3. The device according to claim 1, wherein a locking element (52) is put in a further plate-like element (36") on two adjacent teeth (38) of the further plate-like element (36"), the threaded shaft (46) being positioned and inserted in the slot (39) interposed between said two teeth (38) and in the empty transversal portion (34) of the upper front (30) of the platform (25), the guide (48) being inserted in said empty transversal portion (34), the pusher element (40, 41, 42) being arranged perpendicularly to the upper front (30) of the platform (25) and being slidable with respect thereto and internally to the seat or channel (28).

4. The device according to claim 1, characterized in that the platform (25) comprises an upper front (30) featuring a grating-type structure defined by a plurality of transversal bands (33) being parallel to and equally spaced from each other having two adjacent transversal bands (33) spaced away from each other by an empty transversal portion (34), the patterned appendage (36) comprises a plate-like element (36') projecting outside from a longitudinal edge of the platform (25), and developing longitudinally, and a further plate-like element (36") which develops starting from a longitudinal edge of the plate-like element (36') according to a direction substantially perpendicular to the plane of the plate-like element (36') and in the direction of the upper front (30) of the platform (25), said further plate-like element (36") being provided with a plurality of teeth (38) spaced away from each other by slots (39) such as to define coupling elements with a locking element (52).

5. The device according to claim 1, characterized in that the driving/moving means (44) comprise a drive of the recirculating screw type defined by a threaded shaft (46) along which a guide (48) is slidable, which the pusher element (40, 41, 42) is secured to, a motor (50) secured to one end of the threaded shaft (46), and an engagement/disengagement element (51) used to engage/disengage the clutch of the threaded shaft (46).

6. The device according to claim 5, characterized in that the pusher element (40, 41, 42) is secured to the guide (48) either rigidly or removably.

7. The device according to claim 1, characterized in that the quick locking means used to lock to the shelf (14) comprise a locking element (52) secured to the motor (50) in correspondence with the constraint position with respect to the threaded shaft (46).

8. The device according to claim 7, characterized in that the locking element (52) is substantially U-shaped.

9. An enhanced ejection device (10) for an automatic dispenser (12) of the automatic vending machine type, suitable for being incorporated in said automatic vending machine and being applied to a shelf (14) subdivided into a number of seats or channels (28) defined by opposing separator elements or shoulders (26) internally to which there are accommodated products of different types, characterized in that it comprises handling and ejection means (27) for handling and ejecting products from said seats or channels, quickly couplable with/decoupable from the shelf (14), formed on said shelf (14) by means of quick-coupling means and comprising a platform (25) longitudinally developed and a patterned appendage (36), said platform (25) comprising an upper front (30) featuring a grating-type structure defined by a plurality of transversal bands (33) being parallel to and equally spaced from each other having two adjacent transversal bands (33) spaced away from each other by an empty transversal portion (34) for positioning the handling and ejections means (27) and the patterned appendage (36) which is formed in correspondence with one of the opposing longitudinal edges of the platform (25) and "comb"-shaped, with a plurality of teeth (38) spaced away from each other by slots (39), said teeth (38) and slots (39) developing all over the length of the longitudinal development of said patterned appendage (36).

10. The device according to claim 9, characterized in that the product handling and ejection means (27) comprise a pusher element (40, 41, 42) for pushing the products in their respective seats or channels (28), driving/moving means (44) for moving said pusher element into the seat or channel (28), and quick locking means with respect to the quick coupling means of the shelf (14).

11. An enhanced ejection device (10) for an automatic dispenser (12) of the automatic vending machine type, suitable for being incorporated in said automatic vending machine and being applied to a shelf (14) subdivided into a number of seats or channels (28) defined by opposing separator elements or shoulders (26) internally to which there are accommodated products of different types, characterized in that it comprises handling and ejection means (27) for handling and ejecting products from said seats or channels, quickly couplable with/decoupable from the shelf (14), formed on said shelf (14) and comprising a platform (25) longitudinally developed and a patterned appendage (36) formed in correspondence with one of the opposing longitudinal edges of the platform (25) and "comb"-shaped, with a plurality of teeth (38) spaced away from each other by slots (39), said teeth (38) and slots (39) developing all over the length of the longitudinal development of said patterned appendage (36), wherein a locking element (52) is put in a further plate-like element (36") on two adjacent teeth (38) of the further plate-like element (36"), the threaded shaft (46) being positioned and inserted in the slot (39) interposed between said two teeth (38) and in the empty transversal portion (34) of the upper front (30) of the platform (25), the guide (48) being inserted in said empty transversal portion (34), the pusher element (40, 41, 42) being arranged perpendicularly to the upper front (30) of the platform (25) and being slidable with respect thereto and internally to the seat or channel (28).

\* \* \* \* \*